United States Patent [19]

Dombrowski et al.

[11] 4,030,184

[45] June 21, 1977

[54] METHOD FOR STRIPPING WINDINGS FROM A STATOR

[75] Inventors: Frank R. Dombrowski, Kingston; Raymond L. Larson, Sycamore, both of Ill.

[73] Assignee: General Electric Company, Fort Wayne, Ind.

[22] Filed: Aug. 24, 1976

[21] Appl. No.: 717,293

Related U.S. Application Data

[62] Division of Ser. No. 543,505, Jan. 23, 1975.

[52] U.S. Cl. .................................. 29/403; 269/49; 269/50; 269/52; 29/596
[51] Int. Cl.² ..................... B23Q 17/00; B26D 1/04
[58] Field of Search ................ 29/427, 403, 401 B, 29/596, 205 R, 205 D, 280, 237, 255, 401

[56] References Cited

UNITED STATES PATENTS 3,948,124  4/1976  Dombrowski et al. .............. 29/403

Primary Examiner—C.W. Lanham
Assistant Examiner—V. K. Rising
Attorney, Agent, or Firm—Joseph E. Papin

[57] ABSTRACT

A method of stripping from a dynamoelectric machine stator a plurality of windings thereof having one of a pair of opposite generally annular grouping of end turns of the windings secured therefrom. The method includes the steps of: lowering the stator onto means for seating and supporting it so as to dispose the other of the end turns in a predetermined position; gripping the other end turns for maintaining them generally against displacement from the predetermined positions; and driving the seating means generally upwardly relative to the winding and moving the stator conjointly therewith toward a position displaced from the windings while gripping the other end turns in the predetermined position thereby stripping the windings from the stator.

14 Claims, 4 Drawing Figures

METHOD FOR STRIPPING WINDINGS FROM A STATOR

CROSS-REFERENCE TO RELATED APPLICATION

This application is a division of copending application Ser. No. 543,505 filed Jan. 23, 1975, the contents of which are specifically incorporated by reference herein.

BACKGROUND OF THE INVENTION

This invention relates generally to the salvage of dynamoelectric machine components and in particular to a method for stripping windings from a stator for a dynamoelectric machine.

Dynamoelectric machines, such as an electric motor or the like, are provided with a stator having a pair of opposite and generally parallel end faces intersected by a bore extending axially therebetween through the stator. A plurality of winding receiving slots are also provided in the stator about the bore thereof and intersecting with both the bore and the opposite end face. A plurality of windings generally respectively constituted by a preselected number of turns of copper or aluminum wire or the like are wound or otherwise inserted by means well-known in the art into the stator winding slots. In this manner, opposite sides of the winding turns are disposed within the stator slots, and opposite ends of the winding turns span across a selected number of stator slots adjacent the intersections thereof with the opposite end faces of the stator exteriorly thereof. These opposite ends of the winding turns are respectively formed into generally annular groupings extending from the opposite end faces radially outwardly of the stator bore and are known to the art as end turns. Of course, if desired, the particular wire of the windings may have an insulating coating thereon, and slot liners and wedges of suitable insulating material may be provided between the windings and the stator. Further, in some instances, the stators may be assembled by various means and methods generally well-known to the art as bonding. For a detailed discussion of one such bonded stator and method of assembly thereof reference may be had to U.S. Pat. No. 3,490,143 and U.S. Pat. No. Re. 26,788.

In the past, wound stators, such as described above, which were found to be defective for one reason or another either at the time of manufacture or after usage, were stripped of their windings. In this manner, salvaged stators which were in condition for reuse were rewound, and those which could not be used were sold for scrap. Of course, the stripped windings could not be salvaged and were sold for scrap. In some cases, the entire wound stator may have been sold for scrap, but due to the formidable increases in stator core material, it is now more economically prudent to salvage stators for reuse if possible.

In order to salvage stators, it is first necessary to sever one of the pair of opposite generally annular groupings of end turns of the stator windings therefrom, and various apparatus and methods have been employed in the past to sever one of the end turns from the stator windings. For a detailed description of one apparatus and method for severing end turns from stator windings reference may be had to U.S. Pat. application Ser. No. 541,740 filed Jan. 17, 1975. Further, various other apparatus and methods have been employed in the past to strip the windings from the stator after one of the end turns of the windings had been severed therefrom.

In some of the past apparatus and methods for stripping a winding from a stator, the stator was clamped by suitable clamping means in a desired position atop a table or work bench or the like with the remaining end turns of the stator windings facing upwardly. Tongs were then engaged with a part of the remaining end turns, and the tongs were then driven or pulled upwardly by a hoist or the like. The upward movement of the tongs pulled the remaining end turns and windings therewith to effect the stripping of the windings from the stator. One of the disadvantageous or undesirable features of such past apparatus and method was that too much time was consumed and too many operations were involved in mounting or clamping the stator onto a work table in preparation for the winding stripping operation. Further, another disadvantageous or undesirable feature of such past apparatus and methods was that the tongs would not be operable to completely strip all of the windings from the stator in one pulling operation since the windings poles are separate; therefore, it might be necessary to strip each of the winding poles in separate pulling operations from the stator.

In another of the past apparatus and methods for stripping the windings from a stator, the stator was first mounted to a fixture with the remaining end turns of the windings facing upwardly. A tool was then disposed on the upper end face of the stator having pins predeterminately disposed therein and adapted to be driven by a ram wedge generally radially outwardly to a displaced position interposed between the stator end face and each of the end turns of each of the winding poles. The stator and tool was then inverted on the fixture, and the tool was driven downwardly carrying the end turns of the stator windings on the displaced pins of the tool thereby to strip the windings from the stator. One of the disadvantageous or undesirable features of such past apparatus and method was that too much time was consumed and too many operations were involved with respect to tool placement and the inverting of the stator subsequent to the actuation of the tool for stripping the windings. Another disadvantageous or undesirable feature of such past apparatus and methods was that it may have been necessary to perform the stripping operation twice if the stator was provided with starting windings shifted in phase relation in the stator with respect to the running windings thereof.

In yet another of the past apparatus and method for stripping windings from a wound armature for a dynamoelectric machine, a mandrel was provided on a drill press or the like, and the remaining end turns of the windings were slipped upwardly onto or about a free or lower end of the mandrel by an operator. The free end of the mandrel was tapered so as to, in effect, spread or displace the winding end turns as they were manually moved upwardly onto the tapered free end of the mandrel. Of course, when the engagement between the remaining end turns and the mandrel become great enough, the operator released the armature, and it was thereby suspended from the mandrel free end. The mandrel with the armature suspended therefrom was then lowered into a fixture, and a plurality of cams on the fixture were pivoted thereon to rotatably move fingers or prongs on the cam to position interposed between the upper end face of the armature and the remaining end turns. Of course, since there was no predetermined position of the armature in which the cam fingers engaged the remaining end turns, it was necessary to adjustably raise and lower the mandrel in order to effect the interposition of the cam fingers between the stator end face and the remaining end turns. Thereafter, the mandrel was lowered further driving the armature relative to the windings supported on the cam fingers toward a portion displaced from the windings thereby to strip the windings from the armature. One of the disadvantageous or undesirable features of this past apparatus and method was that it lacked a predetermined or mounting position of the armature in which the cam fingers could be positively engaged with the winding end turns. Another disadvantageous or undesirable feature of the past apparatus and method was that the mounting position of the armature to the mandrel was variable for each armature since it depended upon the particular shaping of the end turns. And still another disadvantageous or undesirable feature of this past apparatus and method was that the mandrel had to be adjustably raised and lowered so as to locate the cam fingers in the interstices between the remaining end turns and the stator end face thereby to consume too much time and effect too many separate operations.

SUMMARY OF THE INVENTION

Among the several objects of the invention may be noted the provision of a method for stripping windings from dynamoelectric machine stators which overcome the disadvantageous or undesirable features, discussed hereinabove, as well as others; the provision of such method in which the stator may be generally loosely mounted to means for seating and supporting it; the provision of such method and in which the stator is positively located on its seating and supporting means even though generally loosely mounted thereto; the provision of such method in which the remaining end turns of the stator are predeterminately positioned so as to be gripped upon the mounting of the stator to its seating and supporting means; the provision of such method in which the remaining end turns of the stator are peripherally gripped thereby to enhance the complete stripping of the windings from the stator in one stripping operation; and the provision of such method which is simplistic and, economical. Other objects and advantageous features of the invention will be in part apparent and in part pointed out hereinafter.

In general, a method is provided in one form of the invention for stripping from a dynamoelectric machine stator a plurality of windings thereof having one of a pair of opposite generally annular groupings of end turns of the windings severed therefrom. In this stripping method, the stator is lowered onto means for seating it so as to dispose the other of the end turns in a predetermined position, and the other end turns are gripped for maintaining them generally against displacement from the predetermined position. The seating means is driven generally upwardly relative to the winding and the stator is moved conjointly therewith toward a position displaced from the windings while the other end turns are gripped in the predetermined position thereby stripping the windings from the stator.

BRIEF DESCRIPTION OF THE DRAWINGS

Corresponding reference characters indicate corresponding parts throughout the several views of the drawings.

Figure 1:
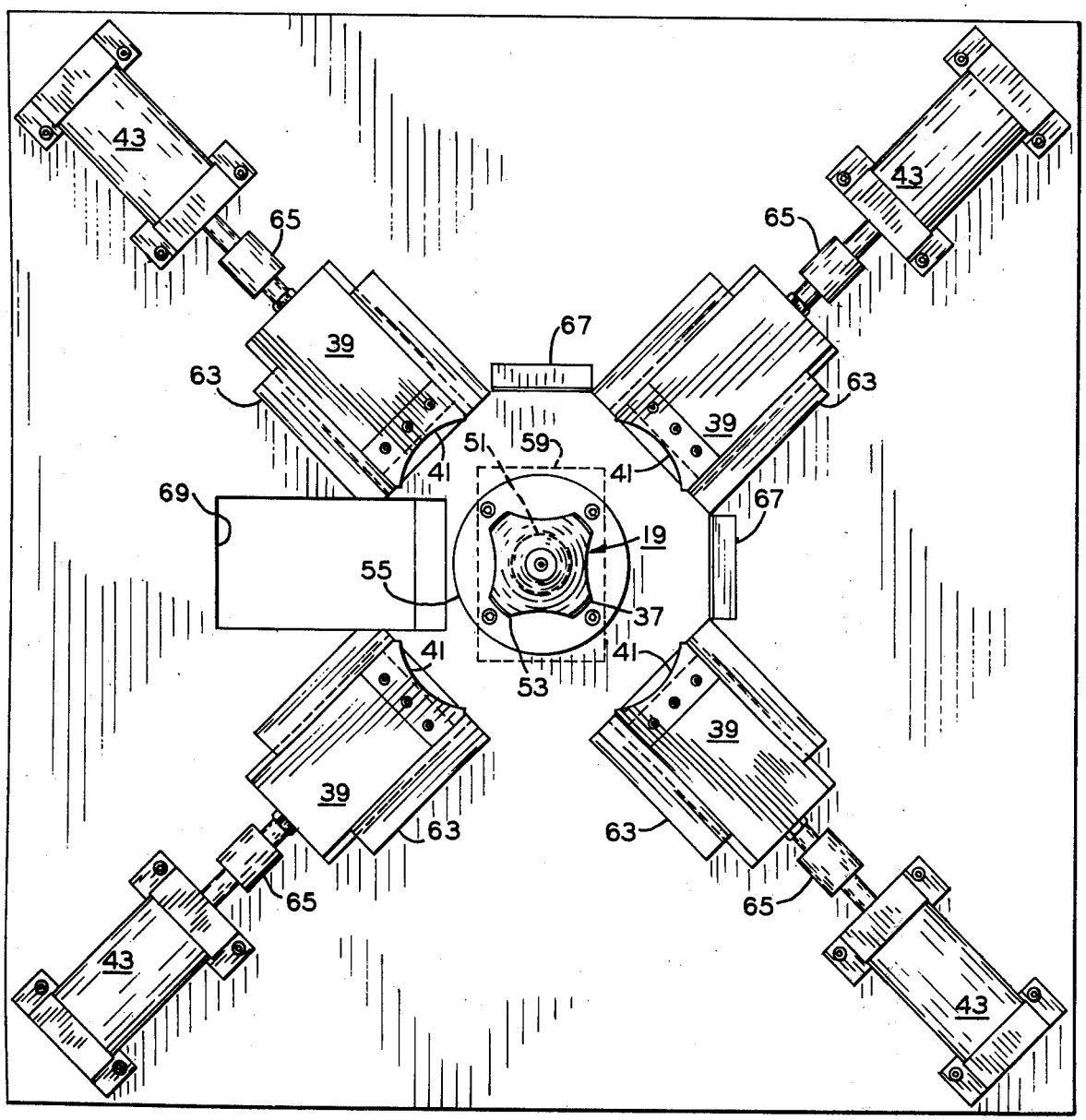
FIG. 1 is a plan view of an apparatus for stripping windings from a stator and illustrating principles of a method in one form of the invention for stripping windings from a stator.

The exemplifications set out herein illustrate the preferred embodiments of the invention in one form thereof, and such exemplifications are not to be construed as limiting in any manner.

DETAILED DESCRIPTION OF THE PREFERRED EMBODIMENTS

Referring now in general to the drawings, there is illustrated in one form of the invention a method for stripping from a dynamoelectric stator 11 a plurality of windings 13 thereof having one pair of opposite generally annular groupings of end turns 15, 17 of the windings severed therefrom. In this stripping method, stator 11 is lowered onto means, such as an arbor 19 or the like, for seating and supporting it so as to dispose the other of the end turns 17 in a predetermined position, and the other end turns are gripped for maintaining them generally against displacement from the predetermined position. Thereafter, the seating and supporting means or arbor 19 is driven generally upwardly relative to windings 13 and stator 11 is moved conjointly therewith toward a position displaced from the winding while other end turns 17 are gripped in the predetermined position thereby stripping the windings from the stator (FIGS. 2–4).

Figure 2:
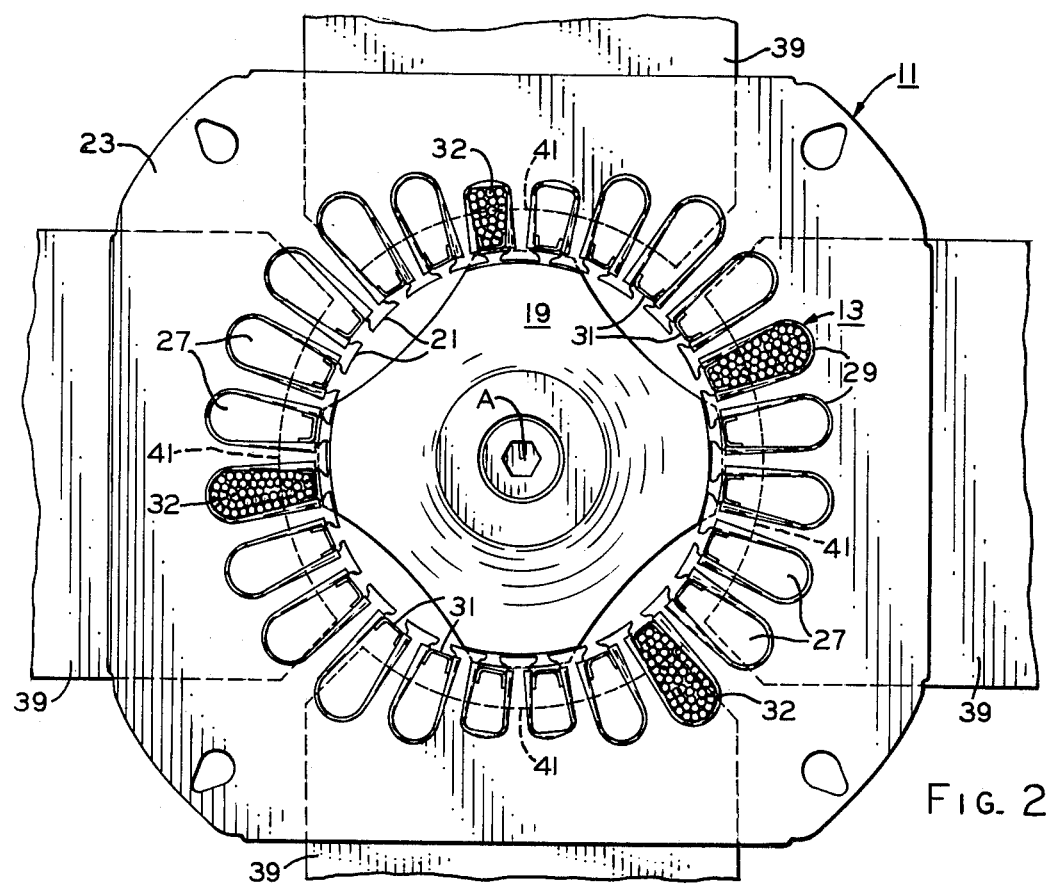
FIG. 2 is an enlarged fragmentary view taken from FIG. 1 illustrating the engagement of gripping means of the apparatus with end turns of the stator in the mounting position thereof.
Figure 3:
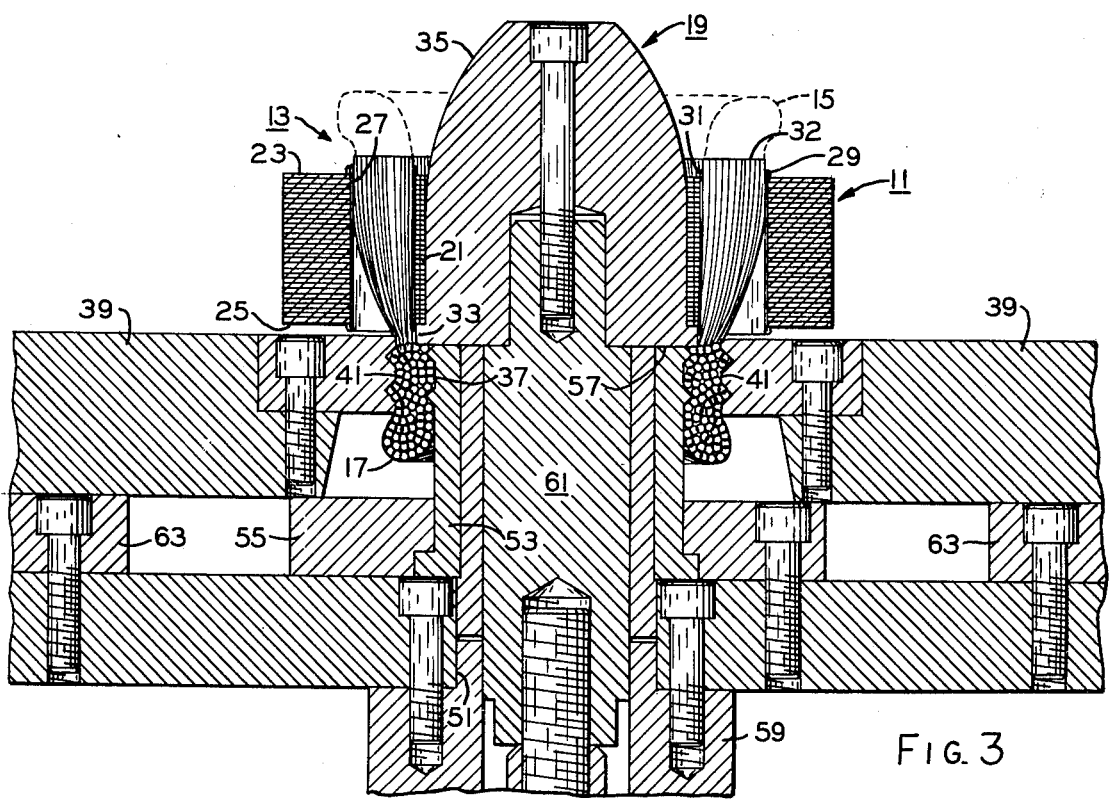
FIG. 3 is a sectional view taken generally along line 3—3 of FIG. 2.
Figure 4:
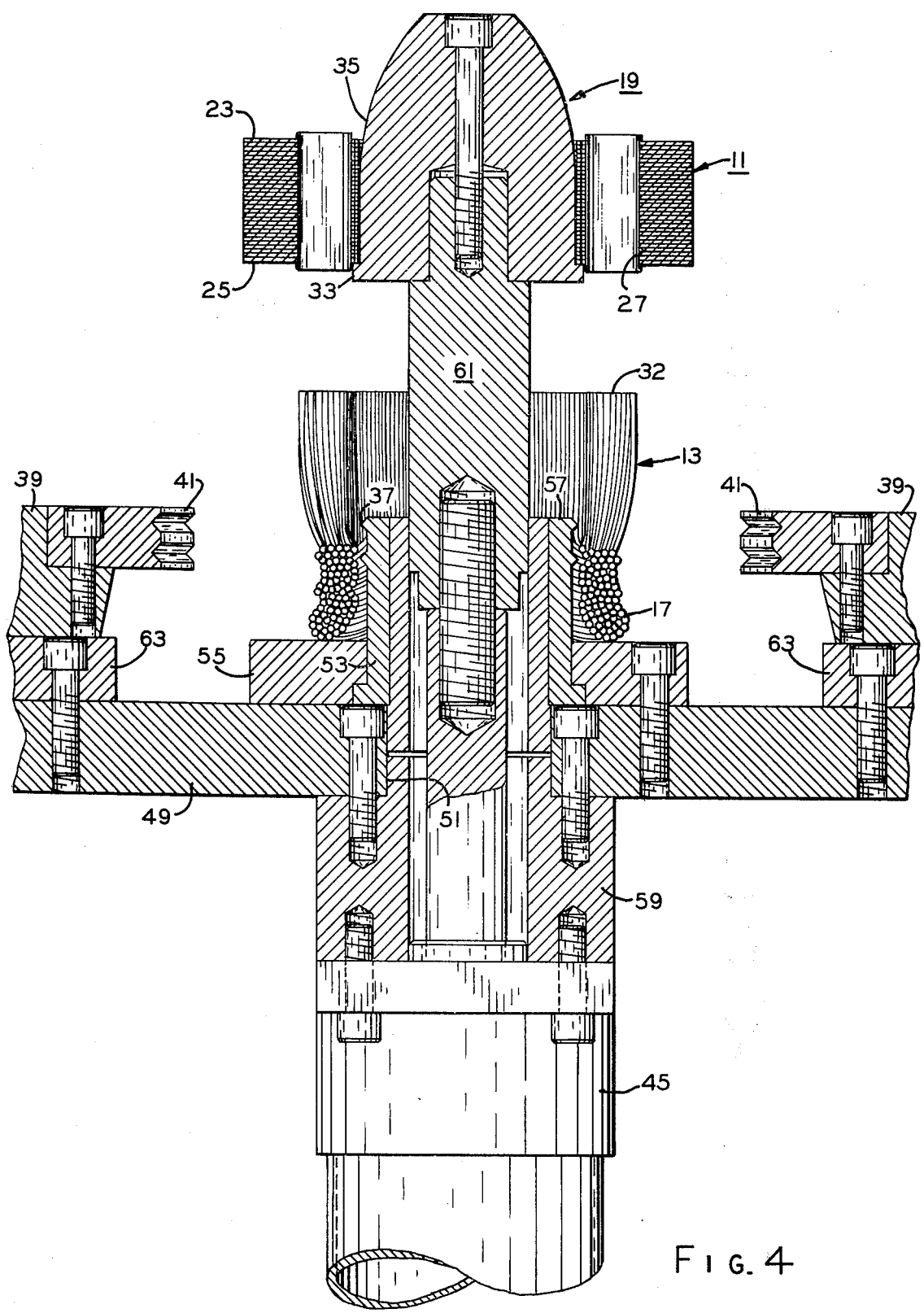
FIG. 4 is an enlarged sectional view taken generally along line 4—4 of FIG. 1.

More particularly and with specific reference to FIGS. 2–4, stator 11 has a bore 21 extending therethrough generally about an axis A and generally normal or perpendicular to a pair of opposite end faces 23, 25. A plurality of winding receiving slots 27 are provided in stator 11 extending generally radially with respect to bore 21 and intersecting with both the bore and end faces 23, 25. Stator windings 13 are generally constituted by a plurality of turns or coils having opposite sides which are received in stator slot 27, and opposite end turns 15, 17 are integral with the opposite sides being formed in the aforementioned opposite, generally annular groupings adjacent stator end faces 23, 25 and spanning between a preselected number of the stator slots thereby to form with stator 11 a plurality of magnetic poles. If desired, windings 13 may be coated with a suitable insulating material, and slot liners 29 and slot wedges 31 of suitable insulating material may be disposed in stator slots 27 between windings 13 and stator 11, as is well-known in the art. As previously mentioned, end turns 15 of stator windings 13 have been severed therefrom leaving a plurality of free ends 32 of the stator winding adjacent end face 23 of stator 11, as best seen in FIG. 3.

Arbor or seating means 19 is provided with a generally radially extending flange 33 on which end face 25 of stator 11 is seated and supported in a mounting or mounted position when the stator is assembled to the arbor by an operator, and as the operator lowers the stator onto the arbor a guiding or locating surface 25 thereon engages stator bore 21. In this manner, the respective engagement of stator bore 21 and end face 25 with arbor guide surface 35 and flange 33 in the mounting position serves to predetermine the position of the other or remaining end turn 17 generally radially between and adjacent a generally annular abutment surface 37 for gripping engagement with a radially inner peripheral portion of the other end turn and a plurality of means, such as gripping bars 39, for gripping a radially outer peripheral portion of the other end turns. Gripping means or gripping bars 39 are respectively provided with a generally arcuate gripping surface 41 which, when engaged with the outer peripheral portion of other end turn 17, generally encompasses the entire periphery thereof, and it may be noted that the gripping surfaces are generally coplanar, as discussed in detail hereinafter. Gripping bars 39 are reciprocally driven by means, such as a plurality of air or hydraulic motors or the like 43 shown in FIG. 1, to grippingly engage gripping surfaces 41 with the outer peripheral portion of other end turns 17 when stator 11 is in the mounting position, and the force of this engagement drives or displaces the other end turns generally radially inwardly into abutting or gripping engagement with annular abutment surface 37. In this manner, other end turns 17 are gripped in their predetermined position between annular abutment surface 37 and gripping bars 39 in the mounting position of stator 11 and arbor 19, and such gripping of the other end turns generally maintains them and stator windings 13 against displacement from the predetermined position or the mounting position of the stator and the arbor.

With other end turns 17 so gripped between annular abutment surface 37 and gripping bars 39, means, such as another air or hydraulic motor 45 or the like shown in FIG. 4, for actuating or driving arbor 19 between its mounting position and its displaced position may be energized or operated to effect the reciprocal movement of the arbor in one direction from the mounting position thereof to the displaced position. Upon such driven movement of arbor 19, stator 11 is conjointly movable therewith toward the displaced position through the plurality of free ends 32 of stator windings 13 from which the one end turns 15 were severed and toward the displaced position thereby to strip the stator windings from stator slots 27. It may be noted that the gripping of other end turns 17 in their predetermined position maintains them and stator winding 13 generally stationary in the mounting position when stator 11 and arbor 19 are moved relative thereto from the mounting position to the displaced position thereby to effect the stripping of the stator windings from the stator.

Referring now again in general to the drawings, there is illustrated an apparatus, indicated generally at 47 (FIG. 1), for stripping from stator 11 the plurality of windings 13 thereof with one of the pair of opposite generally annular groupings of end turns 15, 17 severed therefrom (FIGS. 2–4). Apparatus 47 has means, such as arbor 19, movable between the mounting position and the displaced position for generally loosely seating stator 11 and supporting it in the mounting and displaced positions. Means, such as gripping bars 39 are provided for gripping engagement with other end turn 17 when stator 11 is in the mounting position to generally maintain windings 13 against displacement from the mounting position. Seating and supporting means or arbor 19 is movable from the mounting position in response to a force applied thereto to conjointly move stator 11 relative to windings 13 to the displaced position thereby to effect the stripping of the windings from the stator when the gripping means, i.e., the annular abutment surface 37 and gripping bars 39, is engaged with other end turns 17.

More particularly and with specific reference to FIGS. 1 and 4, apparatus 47 is provided with supporting means, such as a base or generally flat plate or support 49 having a centrally located aperture or opening 51 therethrough. A cylindric member or sleeve 53 is fixedly disposed or positioned on base 49 and generally coaxial with base opening 51 by a locating collar 55 which is fixedly attached by suitable means to the upper side of the base, and annular abutment surface 31 is provided on the cylindric member adjacent an upper end 57 thereof predeterminately spaced from the base. Arbor 19 has its flange 33 seated on upper end 57 of cylindric member 53 in the mounting position of the arbor and stator 11, and the cylindric member is so located that other end turns 17 extend predeterminately downwardly through the plane in which annular abutment surface 37 and gripping bars 41 are generally disposed when the stator is mounted to the arbor in the mounting position. It may also be noted that the engagement of locating surface 35 of arbor 19 with stator bore 21 when stator 11 is mounted to the arbor in the mounting position generally predeterminately disposes or positions the radially inner peripheral portion of other end turns radially about and at least in close spaced relation with annular abutment surface 37 on cylindric member 53. In this manner, arbor 19 locates other end turns 17 in their predetermined position so as to be gripped between annular abutment surface 37 and gripping surfaces 41 of gripping bars 39, as previously mentioned.

A bearing housing 59 is arranged generally coaxially within cylindric member 53 and base opening 51 and extends through base 49 being attached thereto by suitable means. Bearing housing 59 guidably and slidably journals a shaft 61 for axial reciprocal movement therein generally normal or perpendicular to base 49, and arbor 19 is carried on an upper end of the shaft while a lower end thereof is drivenly coupled with air motor 45. Air motor 45 is disposed beneath base 49 and is connected for support by suitable means to the lower end of bearing housing 59. As well-known in the art, the stroke of air motor 45 may be adjustably limited thereby to predetermine the movement of shaft 61 and arbor 19 between the mounting position and the displaced position thereof.

A plurality of means, such as guide blocks 63 of FIGS. 1 and 3, for sliding and guiding engagement with gripping bars 39, are mounted by suitable means to base 49 and spaced generally equidistantly from each other and from base opening 51. Gripping bars 39 and guide blocks 63 are respectively tongued and grooved so that reciprocal movement of the gripping bars may be generally radially directed toward and away from cylindric member 53 in a generally coplanar manner. It may be noted that the sliding and guiding engagement of gripping bars 39 with guide blocks 63 serves to maintain gripping surfaces 41 of the gripping bars generally coplanar with annular abutment surface 37 of cylindric member 53. Air motors 43 are attached to base 49 adjacent guide blocks 63, and the air motors are drivingly coupled at 65 with the gripping bars for imparting the reciprocal movement thereto, respectively. A pair of assembly guards 67 may be fixedly connected by suitable means (not shown) to base 49 between adjacent pairs of guide blocks 63 for preventing wire of the stripped windings from being trapped behind gripping bars 39.

OPERATION

Prefacing the description of the operation of apparatus 47, it will be recalled that stators 11, prior to being loaded onto the apparatus, have had one of the end turns 15 severed therefrom, as illutrated in dotted lines in FIG. 3. Further, the various components of apparatus 47 are disposed in their mounting or at rest positions as shown in the drawings and as described hereinbefore.

An operator for apparatus 47 may load stator 11 to it by manually lowering the stator onto arbor 19. As stator 11 is being so loaded, bore 21 thereof is positioned in a generally loose sliding and guiding engagement about locating surface 35 or arbor 19 and then further lowered on the locating surface until lower end face 25 of the stator is seated on flange 33 of the arbor, as illus'rated in FIG. 3. With stator 11 assembled onto arbor 19 in the mounting position thereof, the remaining or other end turns 17 are automatically disposed in a predetermined position. In this predetermined or mounting position of other end turns 17, the other end turns extend generally through the plane in which is disposed annular abutment surface 37 and gripping surfaces 41 on gripping bars 39. In other words, the radially inner peripheral portion of other end turns 17 is disposed at least in close spaced relation about annular abutment surface 37 and the radially outer peripheral portion of the other end turns is disposed adjacent gripping surfaces 41 of gripping bars 39, as previously mentioned. It may also be noted that stator 11 may be rather loosely mounted to arbor 19 in that only the weight of the stator maintains it against upward displacement from the arbor; however, it is contemplated that means could be employed to positively lock or retain the stator on the arbor against upward displacement within the scope of the invention so as to meet the objects and advantageous features thereof. Of course, the generally loose assembly of stator 11 to arbor 19, as mentioned above, greatly facilitates and simplifies the loading and unloading of the stators on apparatus 47.

With other end turns 17 so disposed in their predetermined positions, air motors 43, as shown in FIG. 1, may be conjointly actuated to conjointly effect the reciprocal movement in one direction of gripping bars 39 in their respective guide blocks 63 to engage gripping surfaces 41 generally about the outer peripheral portion of other end turns 17, as shown in FIGS. 2 and 3. The forces so generated by air motors 43 and transferred through gripping bars 39 onto other end turns 17 deflects or urges the other end turns generally radially inwardly, as seen in FIG. 3, into abutting engagement with annular abutment surface 37. In this manner, when stator 11 is assembled to arbor 19 in the mounting position, other end turns 17 are tightly gripped between annular abutment surface 37 and gripping surfaces 41 which are generally coplanar, and the forces applied by air motors 43 are effective to maintain this gripping engagement of the other end turns thereby to prevent displacement of stator windings 13 from the mounting position.

With other end turns 17 so gripped in their mounting position, air motor 45 may now be actuated to apply a force onto shaft 61 and to effect upward axial movement of the arbor 19 with stator 11 assembled thereto from the mounting position to a displaced position wherein the arbor is disengaged from upper end 57 of cylindric member 53, as shown in FIG. 4. In this conjoint displacement movement of stator 11 and arbor 19 to the displaced position thereof, the stator is moved relative to its windings 13 which are maintained in the mounting position against displacement by the gripping engagement of annular abutment surface 37 and gripping surfaces 41 with other end turns 17. Therefore, since windings 13 are held generally stationary in the mounting position and stator 11 is displaced relative thereto, the displacement of the stator moves it upwardly through free ends 32 of the windings from which was severed the one end turns 15, as previously mentioned, toward the displaced position of the stator. When stator 11 and arbor 19 are so concertedly moved to their displaced position, stator windings 13 are thereby stripped from stator winding slots 27.

Upon such stripping of windings 13 from stator 11, air motors 43 may not be deactuated to effect retraction of gripping bars 39 toward their original or at-rest positions in guide blocks 63 thereby to eliminate the gripping engagement of gripping surfaces 41 on the gripping bars with the periphery of other end turns 17. Thereafter, the stripped windings 13 are free to fall from their predetermined or mounting positions downwardly on to base 49 of apparatus 47 generally about cylindric member 53, as best seen in FIG. 4. Stripped windings 13 usually break apart upon falling onto base 49, and the operator may sweep them through a disposal opening 69, shown in FIG. 1, in the base for collection exteriorly of the apparatus. Of course, if other end turns 17 are laced or otherwise interconnected, as is well-known in the art, it may be necessary for the operator to lift the stripped windings 13 upwardly over arbor 19 after the stripped stator 11 is disassembled and removed therefrom.

Another stator 11 may be loaded onto arbor 19 in its displaced position or the arbor may be returned by air motor 45 to its mounting position before the other stator is loaded thereon for a subsequent cycle or winding stripping operation of apparatus 47.

From the foregoing, it is now apparent that novel methods are provided for stripping windings 13 from stator 11 meeting the objects and advantageous features therefor set forth hereinabove, as well as other, and that modifications as to the precise steps of the methods and the order of such steps may be made by those having ordinary skill in the art without departing from the spirit of the invention and scope thereof as set out by the claims which follow.

What we claim as new and desire to secure by Letters Patent of the United States is:

1. A method of stripping from a dynamoelectric machine stator a plurality of windings thereof having one of a pair of opposite generally annular groupings of end turns of the windings severed therefrom comprising the steps of:
   a. lowering the stator onto means for seating and supporting it so as to dispose the other of the end turns in a predetermined position;
   b. gripping the other end turns for maintaining them generally against displacement friom the predetermined position; and
   c. driving the seating means generally upwardly relative to the winding and moving the stator conjointly therewith toward a position displaced from the windings while gripping the other end turns in the predetermined position thereby stripping the windings from the stator.

2. The method as set forth in claim 1, comprising the preliminary step of spacing generally radially inwardly of the predetermined position of the other end turn means for abutment therewith and disposing generally coplanar with the abutment means and radially outwardly of the predetermined position of the other end turns a plurality of means adapted to engage and drive the other end turns into engagement with the abutment means during the gripping step.

3. The method as set forth in claim 1, comprising the additional step of releasing the other end turns of the stripped windings for subsequent disposal thereof.

4. The method as set forth in claim 1, wherein the lowering step includes locating a portion of the stator on means for guiding it onto the seating means.

5. The method as set forth in claim 1, wherein the gripping step comprises moving a plurality of means for engagement with a radially outer peripheral portion of the other end turns thereinto and displacing the other end turns so that a radially inner portion thereof is engaged with means for abutment therewith.

6. A method for stripping from a dynamoelectric machine stator a plurality of windings thereof having free end portions from which is severed one of a pair of opposite generally annular groupings of end turns of the windings comprising the steps of:
 a. lowering the stator to engage an end face thereof with means for supporting the stator in a mounted position with the free end portions of the windings opposite the stator end face;
 b. gripping the other of the end turns to maintain the windings generally against displacement from the mounted position; and
 c. driving the supporting means relative to the windings and moving the stator conjointly therewith from the mounted position through the free end portions of the windings toward a position displaced therefrom while gripping the end turns to maintain the windings in the mounted position.

7. A method of stripping from a dynamoelectric machine stator a plurality of windings thereof having one of a pair of opposite generally annular groupings of end turns of the windings severed therefrom with the stator disposed on means for seating and supporting it so that the other of the end turns is located in a predetermined position, the method comprising the steps of:
 a. moving a plurality of means for gripping the other end turns into gripping engagement therewith so as to maintain the other end turns against displacement from the predetermined position thereof; and
 b. driving the seating and supporting means independently of the moving means and with respect thereto so as to conjointly move the stator with the seating and supporting means toward a displaced position wherein the windings are generally stripped from the stator subsequent to the moving step.

8. The method as set forth in claim 7 comprising the preliminary step of providing abutment means adjacent the other end turns in the predetermined position thereof for engagement with the other end turns when gripped by the gripping means.

9. The method as set forth in claim 7 wherein the moving step comprises displacing the gripping means generally in coplanar relation with respect to each other into the gripping engagement with the other end turns.

10. The method as set forth in claim 7 comprising the additional step of retracting the gripping means from gripping engagement with the other end turns of the stripped windings for the subsequent disposal thereof.

11. The method as set forth in claim 7 wherein the moving step includes actuating a plurality of motor means respectively associated with the gripping means for moving the gripping means into the gripping with the other end turns.

12. The method as set forth in claim 7 wherein the driving step includes actuating motor means associated with the seating and supporting means for driving it and the stator toward the displaced position.

13. A method of stripping from a dynamoelectric machine stator a plurality of windings thereof having free end portions from which is severed one of a pair of opposite generally annular groupings of end turns of the windings, the method comprising the steps of:
 a. disposing one of a pair of opposite end faces of the stator on means for supporting it in one of a pair of positions of the supporting means with the free end portions of the windings generally opposite the one opposite end face and locating the other of the end turns in a predetermined position generally about means associated with the supporting means for abutting engagement with said other end turns;
 b. moving a plurality of means for gripping the other end turns into gripping engagement with at least a portion of the other end turns and abutting the at least portion of the other end turns with the abutting engagement means so that the other end turns are generally clamped between the gripping means and abutting engagement means against displacement from the predetermined position; and
 c. driving the supporting means from the one position toward the other of the positions thereof and moving the stator conjointly with the supporting means through the free end portions of the windings while the other end turns are clamped between the gripping means and the abutting engagement means in the predetermined position so as to effect the stripping of the windings from the stator.

14. A method of stripping from a dynamoelectric machine a plurality of windings thereof having one of a pair of opposite generally annular groupings of end turns of the windings severed therefrom, the method comprising the steps of:
 a. locating the other of the end turns in a predetermined position with respect to a plurality of means for gripping the other end turns when the stator is disposed on means for supporting it;
 b. moving the gripping means into gripping engagement with the other end turns in the predetermined position thereof; and
 c. displacing the supporting means with the stator thereon toward a position displaced from the windings and stripping the windings from the stator while the other end turns are engaged by the gripping means in the predetermined position of the other end turns.

* * * * *

UNITED STATES PATENT AND TRADEMARK OFFICE
CERTIFICATE OF CORRECTION

PATENT NO. : 4,030,184
DATED : June 21, 1977
INVENTOR(S) : Frank R. Dombrowski & Raymond L. Larson It is certified that error appears in the above-identified patent and that said Letters Patent are hereby corrected as shown below:

Col. 3, line 34, delete "and";
      line 45, delete "," (comma).
Col. 4, line 22, after "one" insert --of a--;
      line 66, delete "25" and insert --35--.
Col. 5, line 61, after "39" insert --,-- (comma).
Col. 7, line 67, delete "and".
Col. 8, line 46, delete "other" and insert --others--.
Col. 9, line 25, delete "for" and insert --of--.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*